United States Patent
Han et al.

(10) Patent No.: US 11,446,890 B2
(45) Date of Patent: Sep. 20, 2022

(54) FOOD PROCESSOR

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Han Han, Foshan (CN); Weijie Chen, Foshan (CN); Yan Tang, Foshan (CN)

(73) Assignees: GUANGDONG MIDEA CONSUMER ELECTRICS MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 937 days.

(21) Appl. No.: 16/234,196

(22) Filed: Dec. 27, 2018

(65) Prior Publication Data

US 2019/0126581 A1   May 2, 2019

Related U.S. Application Data

(63) Continuation of application No. PCT/CN2017/074735, filed on Feb. 24, 2017.

(30) Foreign Application Priority Data

Jul. 6, 2016  (CN) .......................... 201610533881.2
Jul. 6, 2016  (CN) .......................... 201620715213.7

(51) Int. Cl.
*B30B 9/12*  (2006.01)
*A47J 19/00*  (2006.01)
(Continued)

(52) U.S. Cl.
CPC ................ *B30B 9/12* (2013.01); *A47J 19/00* (2013.01); *A47J 19/02* (2013.01); *A47J 19/025* (2013.01);
(Continued)

(58) Field of Classification Search
CPC .... B30B 9/12; A47J 19/00; A47J 19/02; A47J 19/025; A47J 43/046; A47J 43/085; B02C 23/10
See application file for complete search history.

(56) References Cited

U.S. PATENT DOCUMENTS 5,592,873 A * 1/1997 Lee ...................... A47J 19/025
                                                                366/90
5,771,791 A    6/1998 Ling et al.
(Continued)

FOREIGN PATENT DOCUMENTS

CN     101874714 A    11/2010
CN     102039689 A    5/2011
(Continued)

OTHER PUBLICATIONS

Guangdong Midea Consumer Electrics Manufacturing Co, Ltd; Midea Group Co Ltd, Examination Decision, CN201620715213.7, dated Apr. 24, 2019, 10 pgs.
(Continued)

*Primary Examiner* — Omar Flores Sanchez
(74) *Attorney, Agent, or Firm* — Morgan, Lewis & Bockius LLP

(57) ABSTRACT

The present disclosure provides a food processor including: a host component, wherein the host component includes a driving component; a barrel body component mounted on the host component and including: a feed inlet, a first barrel body communicated with the feed inlet, a second barrel body communicated with the first barrel body through a communication opening, a crushing device arranged in the first barrel body, connected to the driving component and rotating under the driving of the driving component, and an extrusion device arranged within the second barrel body, connected to the driving component and rotating under the driving of the driving component; wherein the crushing (Continued)

device can operate with an inner side wall of the first barrel body so as to crush food entering the first barrel body, and the crushed food enters the second barrel body through the communication opening under the action of the crushing device.

19 Claims, 8 Drawing Sheets

(51) Int. Cl.
*A47J 19/02* (2006.01)
*A47J 43/046* (2006.01)
*A47J 43/08* (2006.01)
*B02C 23/10* (2006.01)

(52) U.S. Cl.
CPC ............ *A47J 43/046* (2013.01); *A47J 43/085* (2013.01); *B02C 23/10* (2013.01)

(56) References Cited

U.S. PATENT DOCUMENTS

| | | | | |
|---|---|---|---|---|
| 5,826,500 | A | * 10/1998 | Kemper | ............ C11B 1/06 100/98 R |
| 2012/0216687 | A1 | * 8/2012 | Trovinger | ............ A47J 19/025 99/510 |
| 2012/0266762 | A1 | 10/2012 | Wang et al. | |
| 2013/0081547 | A1 | * 4/2013 | Hu | ............ A47J 19/025 99/495 |
| 2015/0257435 | A1 | 9/2015 | Feinberg et al. | |

FOREIGN PATENT DOCUMENTS

| | | | |
|---|---|---|---|
| CN | 202408412 | U | 9/2012 |
| CN | 202846919 | U | 4/2013 |
| CN | 203207137 | U | 9/2013 |
| CN | 203873526 | U | 10/2014 |
| CN | 203885246 | U | 10/2014 |
| CN | 203926616 | U | 11/2014 |
| CN | 205053700 | U | 3/2016 |
| CN | 205251201 | U | 5/2016 |
| EP | 2494893 | A1 | 9/2012 |
| JP | H11253302 | A | 9/1999 |
| JP | 2013533045 | A | 8/2013 |
| JP | 003191937 | U | 7/2014 |
| JP | 2014221184 | A | 11/2014 |
| JP | 2015027374 | A | 2/2015 |
| JP | 2016054798 | A | 4/2016 |
| KR | 20-200429957 | Y1 | 10/2006 |
| KR | 101343599 | B1 | 12/2013 |
| KR | 10-20140033543 | A | 3/2014 |
| KR | 101485401 | B1 | 1/2015 |
| KR | 101548910 | B1 | 9/2015 |
| WO | WO 2016/013792 | A2 | 1/2016 |
| WO | WO 2016/085153 | A1 | 6/2016 |

OTHER PUBLICATIONS

Guangdong Midea Consumer Electrics Manufacturing Co, Ltd; Midea Group Co Ltd, Office Action, JP2018-567954, dated Feb. 4, 2020, 4 pgs.
Guangdong Midea Consumer Electrics Manufacturing Co, Ltd; Midea Group Co Ltd, First Search of CN 201610533881.2, Jul. 10, 2018, 2 pgs.
Guangdong Midea Consumer Electrics Manufacturing Co, Ltd; Midea Group Co Ltd, Office Action, JP2018-567954, dated Sep. 8, 2020, 3 pgs.
Guangdong Midea Consumer Electrics Manufacturing Co, Ltd; Midea Group Co Ltd, International Search Report, PCT/CN2017/074735, dated May 9, 2017, 4 pgs.
Guangdong Midea Consumer Electrics Manufacturing Co, Ltd; Midea Group Co Ltd, Office Action, CN 201610533881.2, dated Jul. 18, 2018, 10 pgs.
Guangdong Midea Consumer Electrics Manufacturing Co, Ltd., et al., Extended European Search Report, EP17823419.1, dated Apr. 12, 2019, 7 pgs.
Guangdong Midea Consumer Electrics Manufacturing Co, Ltd., et al., Communication Pursuant to Rules 70(2) and 70a(2), EP17823419.1, dated Apr. 30, 2019, 1 pg.
Guangdong Midea Consumer Electric Manufacturing Co., Ltd., Notification of the First Office Action, CN Application No. 202110038616.8, dated Sep. 14, 2021, 8 pgs.
Guangdong Midea Consumer Electrics Manufacturing Co, Ltd., et al., First Office Action, KR1020197001337, dated Aug. 4, 2020, 9 pgs.

* cited by examiner

FOOD PROCESSOR

PRIORITY CLAIM AND RELATED APPLICATION

This application is a continuation application of PCT/CN2017/074735, entitled "FOOD PROCESSOR" filed on Feb. 24, 2017, which claims priority to Chinese Patent Application No. 201610533881.2, filed with the State Intellectual Property Office of the People's Republic of China on Jul. 6, 2016, and entitled "FOOD PROCESSOR", and Chinese Patent Application No. 201620715213.7, filed with the State Intellectual Property Office of the People's Republic of China on Jul. 6, 2016, and entitled "FOOD PROCESSOR", all of which are incorporated herein by reference in their entirety.

TECHNICAL FIELD

The present disclosure relates to the field of kitchen utensils, and more specifically relates to a food processor.

BACKGROUND

Juice machines available on the market are divided into vertical juice machines and horizontal juice machines, the vertical juice machines perform extrusion through spiral heads and filter screens and clean the outer rings of the filter screens through rotary brushes during juicing, therefore, the parts are numerous and the mounting is complicated, meanwhile the holes of the filter screens are too small to be cleaned conveniently, therefore, the consumer experience is very poor, the squeezing of the horizontal juice machines is not so sufficient, and thus the juice yield is relatively low.

Therefore, how to design a juice machine having high juice yield, fewer parts and a simple structure has become an urgent problem to be solved at present.

SUMMARY

The present disclosure aims at solving at least one of the technical problems in the prior art or related art. Therefore, one objective of the present disclosure is to provide a food processor.

In view of this, the embodiment of a first aspect of the present disclosure provides a food processor, including: a host component which includes a driving component; a barrel body component mounted on the host component, wherein the barrel body component includes: a feed inlet; a first barrel body communicated with the feed inlet; a second barrel body communicated with the first barrel body through a communication opening; a crushing device arranged in the first barrel body, connected to the driving component and rotating under the driving of the driving component; and an extrusion device arranged within the second barrel body, connected to the driving component and rotating under the driving of the driving component; wherein the crushing device, through rotation, crushes food entering the first barrel body from the feed inlet against an inner side wall of the first barrel body, and the crushed food enters the second barrel body through the communication opening under the action of the crushing device, whereby juice is separated from residues under the extrusion of the extrusion device in the second barrel body.

According to the food processor provided by the embodiment of the first aspect of the present disclosure, after food enters the first barrel body from the feed inlet, the food is crushed by the match of the crushing device and the side wall of the first barrel body, and the crushed food enters the second barrel body through the communication opening under the action of the crushing device and is extruded by the extrusion device to separate the juice of the food from the residues. In the technical solution, the crushing process and the juice extrusion and residue discharge process of the food are separately performed, no juice extrusion or residue discharge is required in the crushing process, therefore, no filter screen or a rotary brush and other components need to be arranged in the first barrel body, so that the food in the first barrel body can be crushed under the coaction of the first barrel body and the crushing device, meanwhile, preferably, the first barrel body is vertically arranged, the second barrel body is arranged to form an angle that is greater than or equal to 70° and smaller than 180° with the first barrel body, specifically, for example, form an angle that is greater than or equal to 70° and smaller than or equal to 120°, therefore the extrusion device can be approximately horizontally arranged within the second barrel body in the juice extrusion and residue discharge process, that is, a juice extrusion and residue discharge system formed by the second barrel body and the extrusion device is set to be horizontal, accordingly the juice and residues of the food can be conveniently separated, this setting can ensure the juice yield of the food processor on the one hand, and can avoid the use of the filter screen, the rotary brush and other parts and components in the first barrel body on the other hand, in this case, the food processor is simple in structure and is easy to be assembled, meanwhile as the filter screen is cancelled, the cleaning difficulty of the user can be reduced, and then the user experience can be improved.

In the above-mentioned technical solution, preferably, the feed inlet is located on an upper end of the first barrel body, the communication opening is located on the bottom of the first barrel body, and the second barrel body is mounted below the first barrel body and is hermetically communicated with the communication opening.

In addition, the food processor in the above-mentioned embodiment provided by the present disclosure can further have the following additional technical features:

In the above-mentioned technical solution, preferably, the food processor further includes: a juice outlet arranged on the second barrel body, wherein the food juice subjected to juice-residue separation is discharged through the juice outlet; and a residue outlet arranged on the second barrel body, wherein food residues subjected to juice-residue separation is discharged through the residue outlet.

In the technical solution, after the crushed food enters the second barrel body, the juice is separated from the residues under the extrusion of the extrusion device, the separated food juice is discharged from the juice outlet on the second barrel body, and the separated food residues are discharged from the residue outlet on the second barrel body.

In the above-mentioned technical solution, preferably, a filter sheet is arranged at the juice outlet.

In the technical solution, the filter sheet is arranged to prevent the food residues from being discharged from the juice outlet, meanwhile the distance between the filter sheet and the extrusion device can also be reasonably set according to the sizes of the granules of the food residues, so that the automatic cleaning of the filter sheet can be realized by the friction between the extrusion device and the filter sheet, that is, the extrusion device can slide by the surface of the filter sheet while rotating to take away the food residues on the filter sheet.

Preferably, the filter sheet is a metal filter sheet, as the hardness and the wear resistance of the metal filter sheet are relatively good, so when the filter sheet is cleaned by the extrusion device, the situation that the filter sheet is damaged due to insufficient strength can be prevented.

In the above-mentioned technical solution, preferably, an extrusion sheet is arranged at the residue outlet.

In the technical solution, the extrusion sheet is arranged at the residue outlet to further extrude the food, so that the juice-residue separation of the food is more thorough, then more food juice can be extruded, and thus the juice yield of the food processor can be improved. Preferably, the extrusion sheet is an extrusion rubber sheet, and as the extrusion rubber sheet has a certain elasticity, the food residues can be further extruded.

In the above-mentioned technical solution, preferably, the crushing device is a crushing spiral head, and the extrusion device is an extrusion screw.

In the technical solution, the food can be pushed from the feed inlet to the communication opening by the threads of the crushing spiral head, and meanwhile the food can be pushed from the communication opening to the residue outlet by the extrusion screw.

In the above-mentioned technical solution, preferably, the projection width of the communication opening in the radial direction of the extrusion device is greater than the diameter of a location corresponding to the communication opening on the extrusion device, the projection length of the communication opening in the axial direction of the extrusion screw is L, and the value of the projection length L is: $3.8 \text{ mm} \leq L \leq 19.9 \text{ mm}$.

In the technical solution, preferably, the communication opening is formed above the extrusion device, so that the crushed food can be driven to enter the second barrel body by at least using the gravity of the crushed food, then juice extrusion and residue discharge of the crushed food can be realized by using the second barrel body and the extrusion device, meanwhile the size of the communication opening can also be reasonably set through the size of a rod body of the extrusion device, therefore the crushed food can enter a feed segment of the extrusion device more easily, wherein preferably, the projection width of the communication opening in the radial direction of the extrusion device, for example, the extrusion screw, is greater than the diameter of the rod body of the segment corresponding to the communication opening of the extrusion screw, specifically, for example, the projection width of the communication opening in the radial direction of the extrusion screw is equal to the diameter of the rod body of the segment corresponding to the communication opening of the extrusion screw plus 1 mm to 5 mm, and the projection length L of the communication opening in the axial direction of the extrusion device, for example, the extrusion screw, is preferably within the range of 3.8 mm to 19.9 mm.

In the above-mentioned technical solution, preferably, the extrusion device is an extrusion screw, one end of the extrusion screw cooperating with the communication opening is a feed end, and the other end of the extrusion screw cooperating with the residue outlet is a discharge end; wherein the extrusion screw includes a rod body and threads arranged on the rod body, and the area of the cross section of the rod body firstly gradually increases and then gradually decreases from the feed end to the discharge end.

In the technical solution, the extrusion screw is a conical screw, one end thereof having a smaller section is matched with the communication opening to serve as the feed inlet, and the other end thereof having a greater section is matched with the residue outlet to serve as the outlet, by means of this setting, the gap between the extrusion screw and the inner side wall of the second barrel body becomes smaller and smaller from the communication opening to the residue outlet, then the extrusion degree on the crushed food becomes greater and greater, accordingly when the crushed food enters the second barrel body through the communication opening and moves toward the residue outlet in sequence, more food juice is extruded out, so the juice-residue separation of the food is more thorough, and thus the juice yield can be improved.

In the above-mentioned technical solution, preferably, the second barrel body includes: a hollow barrel seat with one open end, wherein the other end of the barrel seat is communicated with the first barrel body through the communication opening; and a barrel lid covering the open end of the barrel seat, wherein the residue outlet is arranged on the barrel lid.

In the technical solution, the barrel seat can be mounted on the first barrel body at first, then the extrusion screw is mounted on the driving component in a driving manner, and the barrel lid is covered on the barrel seat to accomplish the mounting of the second barrel body.

Preferably, the first barrel body and the barrel seat are of an integral structure, this setting can enhance the connecting strength between the first barrel body and the barrel seat on the one hand, and can guarantee the sealing property between the first barrel body and the barrel seat on the other hand, so that the situation of juice leakage can be prevented.

In the above-mentioned technical solution, preferably, the barrel lid is a hollow column body with one open end, wherein the open end of the barrel lid is covering the open end of the barrel seat, the inner cavity of the barrel lid gradually decreases from the open end of the barrel lid to the other end of the barrel lid, and the residue outlet is formed on the end face of the other end of the barrel lid.

In the technical solution, the barrel lid is the hollow column body with one open end, and the inner cavity of the barrel lid gradually decreases from the end close to the barrel seat to the residue outlet, due to this setting, the barrel lid is matched with the shape of the discharge end of the extrusion thread, and on the other hand, when the barrel lid is matched with the extrusion screw, the distance between the extrusion screw and the inner side wall of the barrel lid can be further decreased gradually, and thus the extrusion of the extrusion screw and the second barrel body on the crushed food can be further improved to improve the juice yield. As the residue outlet is formed on the end face of the barrel lid away from the other end of the barrel seat, the extrusion length of the food in the second barrel body can be maximally increased, and thus the extrusion time of the food can be prolonged.

Preferably, the juice outlet is formed in a lower side wall of the barrel seat. As the juice outlet is formed in the lower side wall of the barrel seat, the extruded food juice can be automatically discharged from the juice outlet under the action of gravity, no additional auxiliary residue discharge device needs to be arranged, and accordingly the structure of the product can be simplified.

In the above-mentioned technical solution, preferably, a mounting gap a is arranged between the extrusion screw and the inner side wall of the barrel lid, and the value of the mounting gap a is: $0.3 \text{ mm} \leq a \leq 3.99 \text{ mm}$.

In the technical solution, as the mounting gap is arranged between the extrusion screw and the inner side wall of the barrel lid, it can be guaranteed that the food residues can move between the extrusion screw and the inner side wall of the barrel lid to the residue outlet so as to be discharged from the residue outlet, and the mounting gap is preferably set to be within the range of 0.3 mm to 3.99 mm, thereby not only guaranteeing the extrusion of the second barrel body and the extrusion screw on the crushed food, but also guaranteeing the smooth discharge of the food residues.

In the above-mentioned technical solution, preferably, the inner side wall of the barrel lid has a preset inclination angle γ, and the value of the preset inclination angle γ is $4°≤γ≤30°$.

In the technical solution, the preset inclination angle γ of the barrel lid is set to be within the range of 4° to 30°, thereby not only guaranteeing the extrusion of the second barrel body and the extrusion screw on the crushed food, but also guaranteeing the smooth discharge of the food residues.

In the above-mentioned technical solution, preferably, a plurality of guide and residue discharge ribs distributed at intervals are arranged on the inner side wall of the barrel lid, and the plurality of guide and residue discharge ribs are distributed along the axial direction of the barrel lid.

In the technical solution, as the guide and residue discharge ribs are arranged on the inner side wall of the barrel lid, the food residues can be pushed to the residue outlet more quickly by the threaded fit of the guide and residue discharge ribs and the extrusion screw, therefore, the rotation of the food residues along the extrusion screw can be prevented, and thus the discharge speed of the food residues can be improved to improve the discharge efficiency of the food residues.

In the above-mentioned technical solution, preferably, the size of the guide and residue discharge rib in the radial direction of the barrel lid gradually decreases from one end close to the barrel seat to one end of the residue outlet.

In the technical solution, the height of the guide and residue discharge rib, that is, the size of the guide and residue discharge rib in the radial direction of the barrel lid gradually decreases from one end close to the barrel seat to one end of the residue outlet, therefore the structure of the guide and residue discharge rib adapts to that of the inner cavity of the barrel lid, thereby being more beneficial for the barrel lid to discharge the residues.

In the above-mentioned technical solution, preferably, the plurality of guide and residue discharge ribs are uniformly and symmetrically distributed in the barrel lid. In the technical solution, as the plurality of guide and residue discharge ribs are uniformly and symmetrically distributed in the barrel lid, the residue discharge effects on the same circumferential direction of the barrel lid are the same, therefore due to the arrangement of the guide and residue discharge ribs, the situation of residue blockage caused by pressure difference on the circumferential direction in the barrel lid can be prevented, which is very beneficial for the barrel lid to discharge the residues.

In the above-mentioned technical solution, preferably, at least one groove is arranged on the inner side wall of the first barrel body, and the groove is arranged along the axial direction of the first barrel body; and/or, at least one convex rib is arranged on the inner side wall of the first barrel body, and the convex rib is arranged along the axial direction of the first barrel body.

In the technical solution, the groove or the convex rib is arranged on the inner side wall of the first barrel body to increase the friction between the food and the side wall of the first barrel body, therefore the food can generate greater friction with the side wall of the first barrel body under the action of the crushing device, then the food can be better crushed in the first barrel body, after the food enters the second barrel body, the juice-residue separation of the food is more thorough, accordingly the juice yield can be improved, wherein the form of expression of the groove can be a concave point, at this time, it is equivalent that the groove is small enough, similarly, the form of expression of the convex rib can also be a convex point, and at this time, it is equivalent that the convex rib is small enough.

In the above-mentioned technical solution, preferably, a preset gap b is arranged between the inner side wall of the first barrel body and the crushing device, and the value of the preset gap b is: $0.2\ mm≤b≤5\ mm$.

In the technical solution, as the preset gap b is arranged between the inner side wall of the first barrel body and the crushing device, the food entering the first barrel body is located in the preset gap b and is crushed under the coaction of the first barrel body and the crushing device, and the crushed food is pushed to the communication opening along the crushing device under the guidance of the crushing device and enters the second barrel body through the communication opening.

In the above-mentioned technical solution, preferably, the preset gap b on one end close to the feed inlet is greater than the preset gap b on one end close to the communication opening.

In the technical solution, the first barrel body is set into a shape that is large at the upper part and small at the lower part, that is, the preset gap b gradually decreases from the end close to the feed inlet to the end close to the communication opening, this setting can better crush the food, specifically, for example, when the food just enters the first barrel body, the granules of the food are greater, the distance between the inner side wall of the first barrel body and the crushing device adapts to the granules of the food, under the action of the crushing device and the first barrel body, the food is gradually crushed to smaller granules and gradually moves toward the communication opening, therefore the preset gap b close to the communication opening is set to be smaller, thereby adapting to the sizes of the granules of the food herein on the one hand, and further crushing the food herein to smaller granules under the coaction of the crushing device and the first barrel body on the other hand, accordingly gradual and sufficient crushing of the food can be realized, and then the juice yield of the food can be improved.

In the above-mentioned technical solution, preferably, the first barrel body and/or the second barrel body are/is made of a transparent material or a stainless steel material.

In the technical solution, since the first barrel body and the second barrel body are made of the transparent material, the user can clearly see the food in the first barrel body and the second barrel body, as a result, the user can master the condition of the food in the first barrel body and the second barrel body, and thus the user experience can be improved. If the first barrel body and the second barrel body are made of the stainless steel material, the strength of the first barrel body and the second barrel body can be ensured on the one hand, and the rusting and other conditions of the first barrel body and the second barrel body can be prevented on the other hand, therefore the durability of the first barrel body and the second barrel body can be improved.

In the above-mentioned technical solution, preferably, the driving component includes a motor on which a motor shaft is arranged; a transmission component which at least includes: a first transmission part which is in driving connection with the motor shaft, wherein a first driving shaft is arranged on the first transmission part, and the first driving shaft is connected to the crushing device and is used for driving the crushing device to rotate; and a second transmission part which is in driving connection with the motor shaft, wherein a second driving shaft is arranged on the second transmission part, and the second driving shaft is connected to the extrusion device and is used for driving the extrusion device to rotate.

In the technical solution, two or more driving shafts can simultaneously drive the crushing device and the extrusion device by means of the transmission of the same motor and the transmission component, that is, the driving component drives a plurality of shafts, including two or more shafts, by the same motor, the driving shafts can be realized by the same reduction gearbox or different reduction gearboxes, and specifically, the direction can be changed by different gear transmission or other transmission manners, such as a helical gear, a bevel gear, a turbine, a worm, a staggered shaft helical gear and the like, in order to realize preset angle output among the plurality of driving shafts.

Preferably, the first driving shaft is vertically arranged, the second driving shaft forms a preset angle β with the first driving shaft, wherein preferably, the value of the preset angle β is: 60°≤β≤135°, further preferably, the value of the preset angle β is greater than or equal to 70° and is smaller than or equal to 120°, and specifically, for example, the value of the preset angle β is 90°.

In the technical solution, the first barrel body can be vertically arranged, the first driving shaft can be vertically arranged in the first barrel body, meanwhile, the feed inlet is formed in the upper end of the first barrel body, and the communication opening is formed in the bottom of the first barrel body, by means of this setting, the food in the first barrel body can enter the second barrel body more quickly and more smoothly under the dual function of the gravity of the food and the crushing device, and thus the crushing efficiency of the food in the crushing phase can be improved. Meanwhile, preferably, the second barrel body can be arranged on one side below the first barrel body and communicate with the first barrel body through the communication opening, by means of this setting, the crushed food in the first barrel body can enter the second barrel body easily, but the included angle between the first barrel body and the second barrel body cannot be too small or too large, otherwise the smoothness of the second barrel body is insufficient, thus cannot extrude the juice and discharge the residues just like the horizontal juicer, therefore the included angle between the first barrel body and the second barrel body is preferably within the range of being greater than or equal to 70° and smaller than or equal to 120°, at this time, the preset angles of the first driving shaft and the second driving shaft are within the range of being greater than or equal to 70° and smaller than or equal to 120°, this setting is very beneficial for the second barrel body to extrude juice and discharge residues, and thus the juice yield can be improved.

In the above-mentioned technical solution, preferably, a rotating speed ratio of the first driving shaft to the second driving shaft is A, and the value of the rotating speed ratio A is: 0.8≤A≤1.5, specifically, for example, when the rotating speed of the crushing device is 60 RPM, the rotating speed of the extrusion device is set to 48-90 RPM, wherein RPM is a rotating speed unit, that is, revolutions/minute.

In the technical solution, the rotating speed ratio A of the first driving shaft to the second driving shaft is reasonably set to make the food crushing degree adapt to the juice extrusion and residue discharge degree, thereby preventing the situation of insufficient food crushing or insufficient juice extrusion and the like, and accordingly the food can be sufficiently crushed and can also be sufficiently extruded to improve the juice yield of the food.

In the above-mentioned technical solution, preferably, rotating directions of the first driving shaft and the second driving shaft are the same or opposite.

In the technical solution, the first driving shaft and the second driving shaft can rotate on the same direction, for example, rotating clockwise or rotating counterclockwise, of course, the first driving shaft and the second driving shaft can also rotate oppositely, and specifically, for example, one rotates clockwise while the other rotates counterclockwise.

In the above-mentioned technical solution, preferably, the transmission component further includes: a shell, wherein the shell includes an upper shell and a lower shell, which are assembled together, the upper shell and the lower shell are enclosed to form a mounting cavity, the first transmission part and the second transmission part are located in the mounting cavity, and the first driving shaft and the second driving shaft extend out from the shell.

In the technical solution, the first transmission part, the second transmission part, the first driving shaft and the second driving shaft can be mounted in the shell, therefore during specific use, the transmission component can be moved and replaced as an entirety.

In the above-mentioned technical solution, preferably, the transmission component further includes a deceleration component arranged between the first transmission part and the motor shaft and/or between the second transmission part and the motor shaft and used for reducing the rotating speed of the motor shaft to a rotating speed necessary for the first driving shaft and/or the second driving shaft.

In another technical solution, of course, the rotation of the crushing device and the extrusion device can also be driven by two motors, or the rotation of the crushing device and the extrusion device is driven without using the motor or in other driving manners, and specifically, for example, the crushing device and the extrusion device can be driven by an electromagnetic driving structure formed by combining an energized coil with a magnet.

In the above-mentioned technical solution, preferably, the food processor further includes: a feeding barrel arranged within the first barrel body, wherein the feed inlet is formed in the feeding barrel.

In the technical solution, a feeding barrel can be specially arranged for controlling the feeding of the food, and at this time, the feed inlet is formed in the feeding barrel.

In another technical solution, of course, no feeding barrel is specially arranged, and the food is directly placed in the first barrel body at one time, at this time, a lid capable of being opened or closed is arranged within the first barrel body, and the feed inlet is the opening of the first barrel body.

In the above-mentioned technical solution, preferably, the host component further includes a base and an enclosure, wherein the enclosure and the base are enclosed to form an accommodation cavity, and the driving component is mounted on the base and is located in the accommodation cavity.

In the above-mentioned technical solution, preferably, the host component further includes a control module used for controlling working parameters of the food processor, specifically, for example, the rotating speeds of the crushing device and the extrusion device, etc.

In the above-mentioned technical solution, preferably, the host component further includes a power supply module, wherein the power supply module is used for supplying power for the parts and components of the food processor, for example, the driving component, and the power supply module at least includes a power plug that can be inserted into the electric supply, and thus, during specific use, the power plug can be directly connected to the electric supply so as to supply power for the food processor.

In the above-mentioned technical solution, preferably, the food processor includes a juice machine and a juicer.

Additional aspects and advantages of the present disclosure will be become apparent in the description below, or may be learned by the practice of the present disclosure.

BRIEF DESCRIPTION OF DRAWINGS

The above-mentioned and/or additional aspects and advantages of the present disclosure will become apparent and be understood easily from the following description of the embodiments taken in conjunction with the accompanying drawings, in which.

Figure 1:
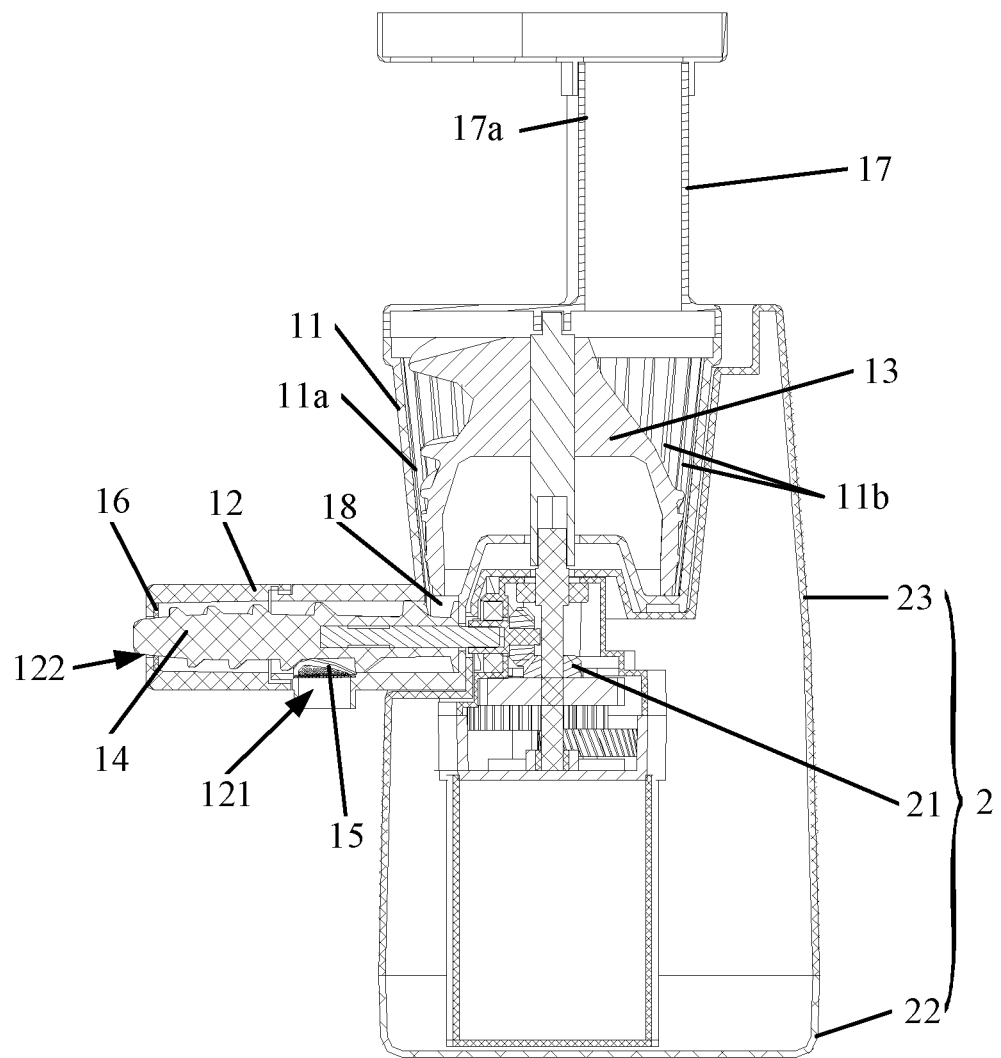
FIG. 1 is a structural schematic diagram of the food processor in one embodiment of the present disclosure.

The corresponding relation between reference signs in FIG. 1 to FIG. 9 and component names is as follows:

1: barrel body component
11: first barrel body
12: second barrel body
121: juice outlet
122: residue outlet
123: barrel seat
124: barrel lid
1241: guide and residue discharge rib
13: crushing device
14: extrusion device
15: filter sheet
16: extrusion sheet
17: feeding barrel
18: communication opening
2: host component
21: driving component
211: motor
212: first transmission part
213: first driving shaft
214: second transmission part
215: second driving shaft
216: lower shell
217: upper shell
218: deceleration component
22: base, and
23: enclosure.

DETAILED DESCRIPTION OF EMBODIMENTS

In order that the above-mentioned objectives, features and advantages of the present disclosure can be understood more clearly, a further detailed description of the present disclosure will be given below in combination with accompanying drawings and embodiments. It should be noted that the embodiments of the present application and the features in the embodiments can be combined with one another in the absence of no conflict.

In the following description, numerous specific details are set forth in order to provide a thorough understanding of the present disclosure. However, the present disclosure can also be implemented in other manners different from those described herein. Therefore, the protection scope of the present disclosure is not limited to the specific embodiments disclosed below.

A food processor provided by some embodiments of the present disclosure is described below with reference to FIG. 1 to FIG. 9.

As shown in FIG. 1 to FIG. 9, the food processor provided by the embodiment of the first aspect of the present disclosure includes a host component 2 which includes a driving component 21; a barrel body component 1 mounted on the host component 2, wherein the barrel body component 1 includes: a feed inlet 17a; a first barrel body 11 communicated with the feed inlet 17a; a second barrel body 12 communicated with the first barrel body 11 through a communication opening 18; a crushing device 13 arranged in the first barrel body 11, connected to the driving component 21 and rotating under the driving of the driving component 21; and an extrusion device 14 arranged within the second barrel body 12, connected to the driving component 21 and rotating under the driving of the driving component 21; wherein the crushing device 13 can operate with an inner side wall 11a of the first barrel body 11 while rotating so as to crush food entering the first barrel body 11 from the feed inlet 17a, and the crushed food enters the second barrel body 12 through the communication opening 18 under the action of the crushing device 13, and juice is separated from residues under the extrusion of the extrusion device 14 in the second barrel body 12.

According to the food processor provided by the embodiment of the first aspect of the present disclosure, after the food enters the first barrel body 11 from the feed inlet, the food is crushed by the match of the crushing device 13 and the side wall of the first barrel body 11, and the crushed food enters the second barrel body 12 through the communication opening 18 under the action of the crushing device 13 and is extruded by the extrusion device 14 to separate the juice of the food from the residues. In the technical solution, the crushing process and the juice extrusion and residue discharge process of the food are separately performed, no juice extrusion or residue discharge is required in the crushing process, therefore no filter screen or a rotary brush and other components need to be arranged in the first barrel body 11, so that the food in the first barrel body 11 can be crushed under the coaction of the first barrel body 11 and the crushing device 13, meanwhile, preferably, the first barrel body 11 is vertically arranged, the second barrel body 12 is arranged to form an angle that is greater than or equal to 70° and smaller than 180° with the first barrel body 11, specifically, for example, form an angle that is greater than or equal to 70° and smaller than or equal to 120°, therefore the extrusion device 14 can be approximately horizontally arranged within the second barrel body 12 in the juice extrusion and residue discharge process, that is, a juice extrusion and residue discharge system formed by the second barrel body 12 and the extrusion device 14 is set to be horizontal, accordingly the juice and residues of the food can be conveniently separated, this setting can ensure the juice yield of the food processor on the one hand, and can avoid the use of the filter screen, the rotary brush and other parts and components in the first barrel body 11 on the other hand, in this case, the food processor is simple in structure and is easy to be assembled, meanwhile as the filter screen is cancelled, the cleaning difficulty of the user can be reduced, and then the user experience can be improved.

In the above-mentioned technical solution, preferably, as shown in FIG. 1, the feed inlet is located on an upper end of the first barrel body 11, the communication opening 18 is located on the bottom of the first barrel body 11, and the second barrel body 12 is mounted below the first barrel body 11 and is hermetically communicated with the communication opening 18.

In the above-mentioned technical solution, preferably, as shown in FIG. 1, the food processor further includes: a juice outlet 121 arranged on the second barrel body 12, wherein the food juice subjected to juice-residue separation is discharged through the juice outlet 121; and a residue outlet 122 arranged on the second barrel body 12, wherein food residues subjected to juice-residue separation is discharged through the residue outlet 122.

In the technical solution, after the crushed food enters the second barrel body 12, the juice is separated from the residues under the extrusion of the extrusion device 14, the separated food juice is discharged from the juice outlet 121 on the second barrel body 12, and the separated food residues are discharged from the residue outlet 122 on the second barrel body 12.

In the above-mentioned technical solution, preferably, as shown in FIG. 1, a filter sheet 15 is arranged at the juice outlet 121.

In the technical solution, the filter sheet 15 is arranged to prevent the food residues from being discharged from the juice outlet 121, meanwhile the distance between the filter sheet 15 and the extrusion device 14 can also be reasonably set according to the sizes of the granules of the food residues, so that the automatic cleaning of the filter sheet 15 can be realized by the friction between the extrusion device 14 and the filter sheet 15, that is, the extrusion device 14 can slide by the surface of the filter sheet 15 while rotating to take away the food residues on the filter sheet 15.

Preferably, the filter sheet 15 is a metal filter sheet, as the hardness and the wear resistance of the metal filter sheet are relatively good, so when the filter sheet 15 is cleaned by the extrusion device 14, the situation that the filter sheet 15 is damaged due to insufficient strength can be prevented.

In the above-mentioned technical solution, preferably, as shown in FIG. 1, an extrusion sheet 16 is arranged at the residue outlet 122.

In the technical solution, the extrusion sheet 16 is arranged at the residue outlet 122 to further extrude the food, so that the juice-residue separation of the food is more thorough, then more food juice can be extruded, and thus the juice yield of the food processor can be improved. Preferably, the extrusion sheet 16 is an extrusion rubber sheet, and as the extrusion rubber sheet has a certain elasticity, the food residues can be further extruded.

Figure 2:
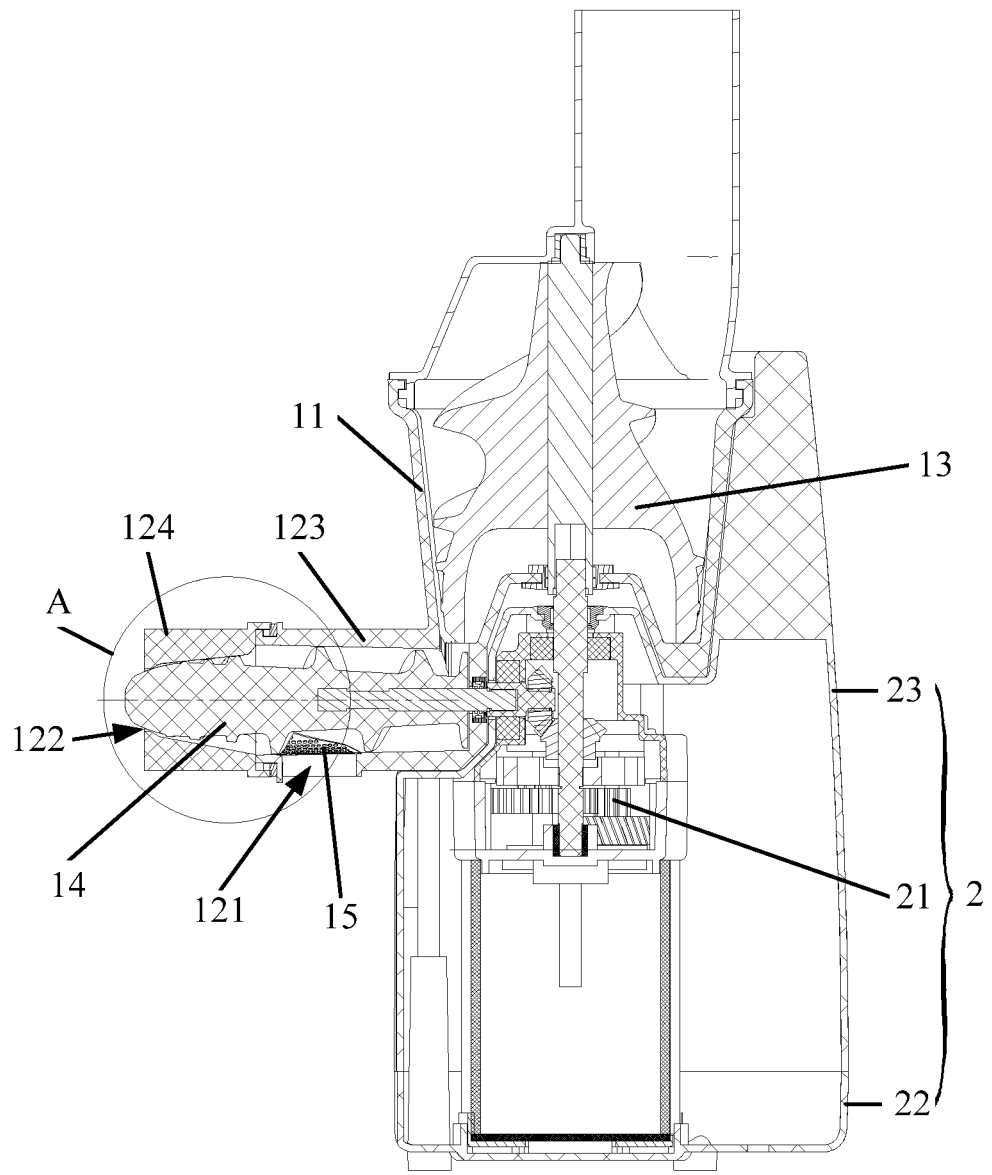
FIG. 2 is another structural schematic diagram of the food processor in one embodiment of the present disclosure.

In the above-mentioned technical solution, preferably, as shown in FIG. 1 and FIG. 2, the crushing device 13 is a crushing spiral head, and the extrusion device 14 is an extrusion screw.

In the technical solution, the food can be pushed from the feed inlet to the communication opening 18 by the threads of the crushing spiral head, and meanwhile the food can be pushed from the communication opening 18 to the residue outlet by the extrusion screw.

Figure 6:
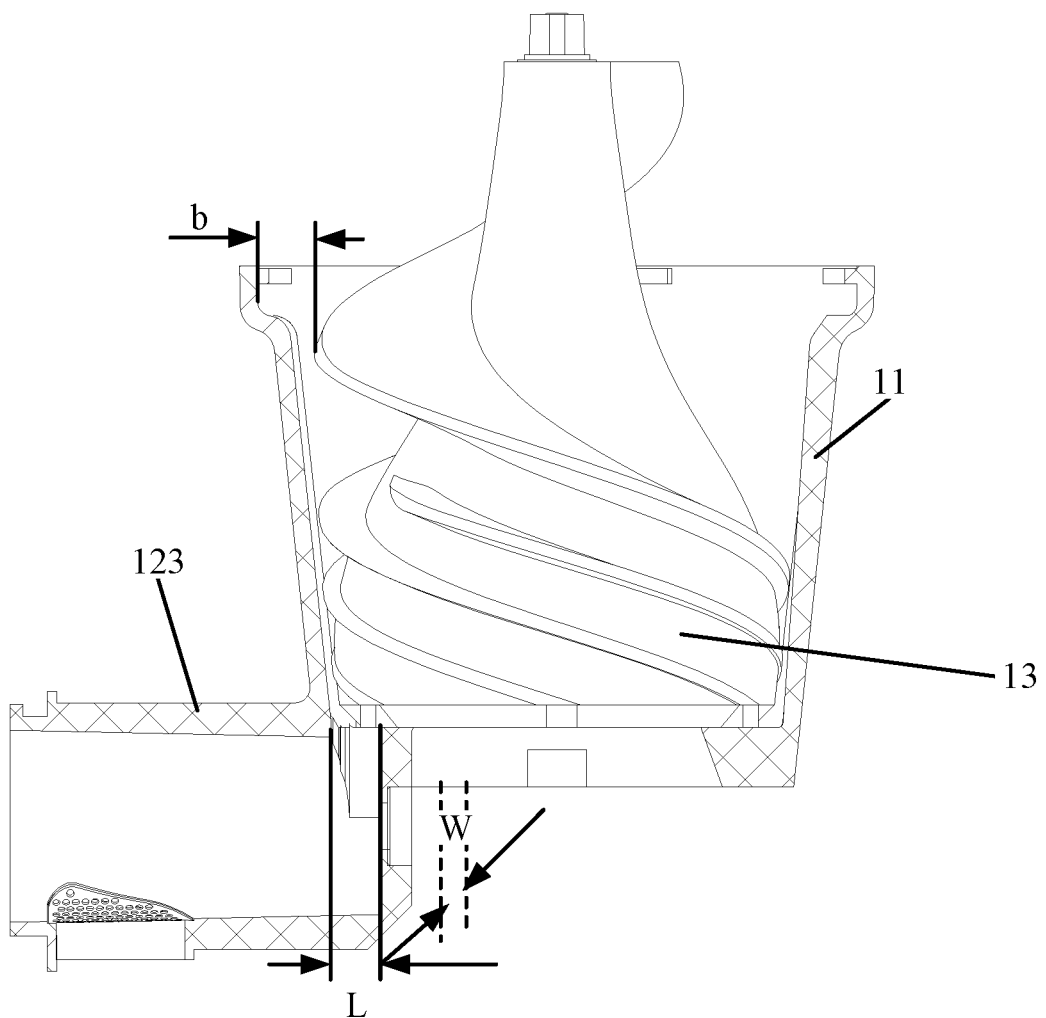
FIG. 6 is a schematic diagram of a local structure of the food processor in one embodiment of the present disclosure.

In the above-mentioned technical solution, preferably, as shown in FIG. 6, the projection width W of the communication opening 18 in the radial direction of the extrusion device 14 is greater than the diameter of a location corresponding to the communication opening 18 on the extrusion device 14, the projection length of the communication opening 18 in the axial direction of the extrusion screw is L, and the value of the projection length L is: $3.8\ mm \leq L \leq 19.9\ mm$.

In the technical solution, preferably, the communication opening 18 is formed above the extrusion device 14, so that the crushed food can be driven to enter the second barrel body 12 by at least using the gravity of the crushed food, then juice extrusion and residue discharge of the crushed food can be realized by using the second barrel body 12 and the extrusion device 14, meanwhile the size of the communication opening 18 can also be reasonably set through the size of a rod body of the extrusion device 14, therefore the crushed food can enter a feed segment of the extrusion device 14 more easily, wherein preferably, the projection width of the communication opening 18 in the radial direction of the extrusion device 14, for example, the extrusion screw, is greater than the diameter of the rod body of the segment corresponding to the communication opening 18 of the extrusion screw, specifically, for example, the projection width of the communication opening 18 in the radial direction of the extrusion screw is equal to the diameter of the rod body of the segment corresponding to the communication opening 18 of the extrusion screw plus 1 mm to 5 mm, and the projection length L of the communication opening 18 in the axial direction of the extrusion device 14, for example, the extrusion screw, is preferably within the range of 3.8 mm to 19.9 mm.

Figure 3:
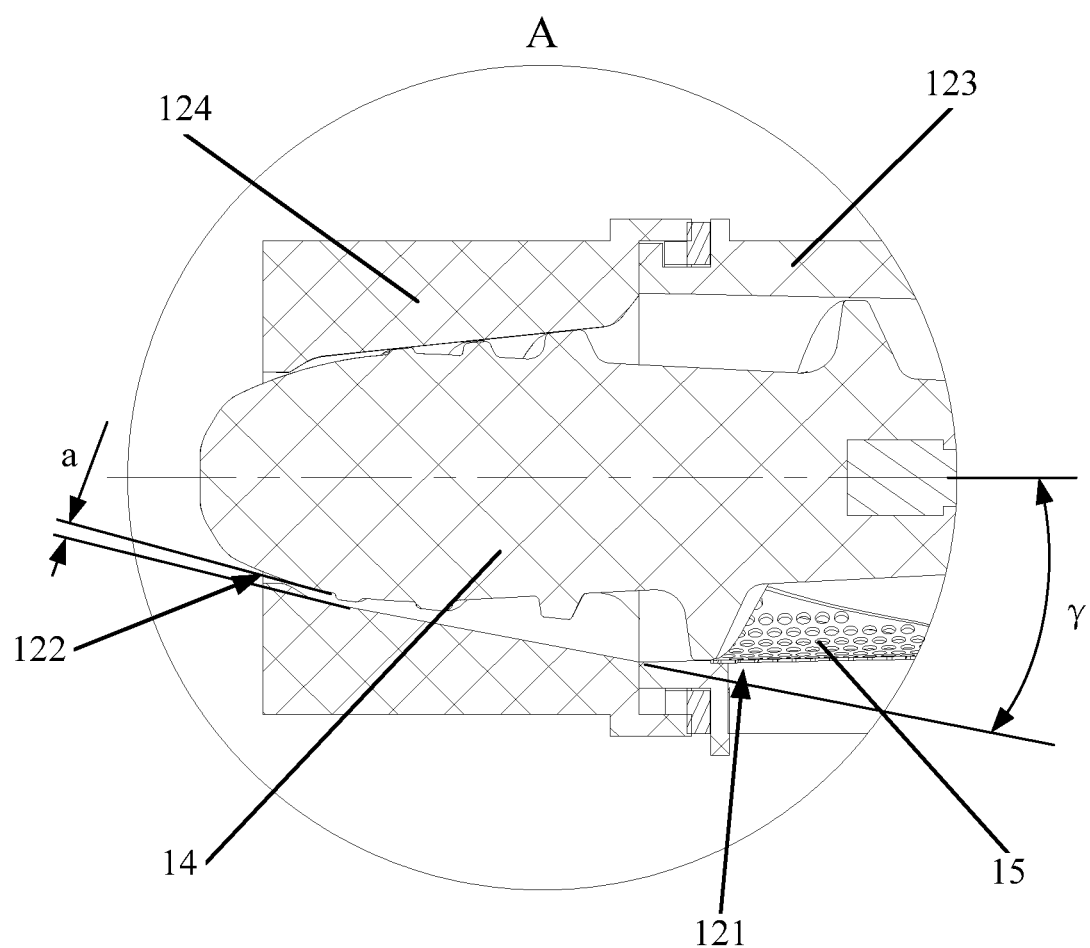
FIG. 3 is a schematic diagram of an amplified structure of a location A as shown in FIG. 2.

In the above-mentioned technical solution, preferably, as shown in FIG. 2 and FIG. 3, the extrusion device 14 is an extrusion screw, one end of the extrusion screw cooperating with the communication opening 18 is a feed end, and the other end of the extrusion screw cooperating with the residue outlet 122 is a discharge end; wherein the extrusion screw includes a rod body and threads arranged on the rod body, and the area of the cross section of the rod body firstly gradually increases and then gradually decreases from the feed end to the discharge end.

In the technical solution, the extrusion screw is a conical screw, one end thereof having a smaller section is matched with the communication opening 18 to serve as the feed inlet, and the other end thereof having a greater section is matched with the residue outlet 122 to serve as the outlet, by means of this setting, the gap between the extrusion screw and the inner side wall of the second barrel body 12 becomes smaller and smaller from the communication opening 18 to the residue outlet 122, then the extrusion degree on the crushed food becomes greater and greater, accordingly when the crushed food enters the second barrel body 12 through the communication opening 18 and moves toward the residue outlet 122 in sequence, more food juice is extruded out, so the juice-residue separation of the food is more thorough, and thus the juice yield can be improved.

In the above-mentioned technical solution, preferably, as shown in FIG. 2 and FIG. 3, the second barrel body 12 includes: a hollow barrel seat 123 with one open end, wherein the other end of the barrel seat 123 is communicated with the first barrel body 11 through the communication opening 18; and a barrel lid 124 covering the open end of the barrel seat 123, wherein the residue outlet 122 is arranged on the barrel lid 124. In the technical solution, the barrel seat 123 can be mounted on the first barrel body 11 at first, then the extrusion screw is mounted on the driving component in a driving manner, and the barrel lid 124 is covered on the barrel seat 123 to accomplish the mounting of the second barrel body 12.

Preferably, the first barrel body 11 and the barrel seat 123 are of an integral structure, this setting can enhance the connecting strength between the first barrel body 11 and the barrel seat 123 on the one hand, and can guarantee the sealing property between the first barrel body 11 and the barrel seat 123 on the other hand, so that the situation of juice leakage can be prevented.

In the above-mentioned technical solution, preferably, as shown in FIG. 2 and FIG. 3, the barrel lid 124 is a hollow column body with one open end, wherein the open end of the barrel lid 124 is covering the open end of the barrel seat 123, the inner cavity of the barrel lid 124 gradually decreases from the open end of the barrel lid 124 to the other end of the barrel lid 124, and the residue outlet 122 is formed on the end face of the other end of the barrel lid 124.

In the technical solution, the barrel lid 124 is the hollow column body with one open end, and the inner cavity of the barrel lid 124 gradually decreases from the end close to the barrel seat 123 to the residue outlet 122, due to this setting, the barrel lid 124 is matched with the shape of the discharge end of the extrusion thread, and on the other hand, when the barrel lid is matched with the extrusion screw, the distance between the extrusion screw and the inner side wall of the barrel lid 124 can be further decreased gradually, and thus the extrusion of the extrusion screw and the second barrel body on the crushed food can be further improved to improve the juice yield. As the residue outlet 122 is formed on the end face of the barrel lid 124 away from the other end of the barrel seat 123, the extrusion length of the food in the second barrel body 12 can be maximally increased, and thus the extrusion time of the food can be prolonged.

Preferably, the juice outlet 121 is formed in a lower side wall of the barrel seat 123. As the juice outlet 121 is formed in the lower side wall of the barrel seat 123, the extruded food juice can be automatically discharged from the juice outlet 121 under the action of gravity, no additional auxiliary residue discharge device needs to be arranged, and accordingly the structure of the product can be simplified.

In the above-mentioned technical solution, preferably, as shown in FIG. 3, a mounting gap a is arranged between the extrusion screw and the inner side wall of the barrel lid 124, and the value of the mounting gap a is: 0.3 mm≤a≤3.99 mm.

In the technical solution, as the mounting gap is arranged between the extrusion screw and the inner side wall of the barrel lid 124, it can be guaranteed that the food residues can move between the extrusion screw and the inner side wall of the barrel lid 124 to the residue outlet 122 so as to be discharged from the residue outlet 122, and the mounting gap a is preferably set to be within the range of 0.3 mm to 3.99 mm, thereby not only guaranteeing the extrusion of the second barrel body and the extrusion screw on the crushed food, but also guaranteeing the smooth discharge of the food residues.

In the above-mentioned technical solution, preferably, as shown in FIG. 3, the inner side wall of the barrel lid 124 has a preset inclination angle γ, and the value of the preset inclination angle γ is: 4°≤γ≤30°.

In the technical solution, the preset inclination angle γ of the barrel lid 124 is set to be within the range of 4° to 30°, thereby not only guaranteeing the extrusion of the second barrel body 12 and the extrusion screw on the crushed food, but also guaranteeing the smooth discharge of the food residues.

Figure 4:
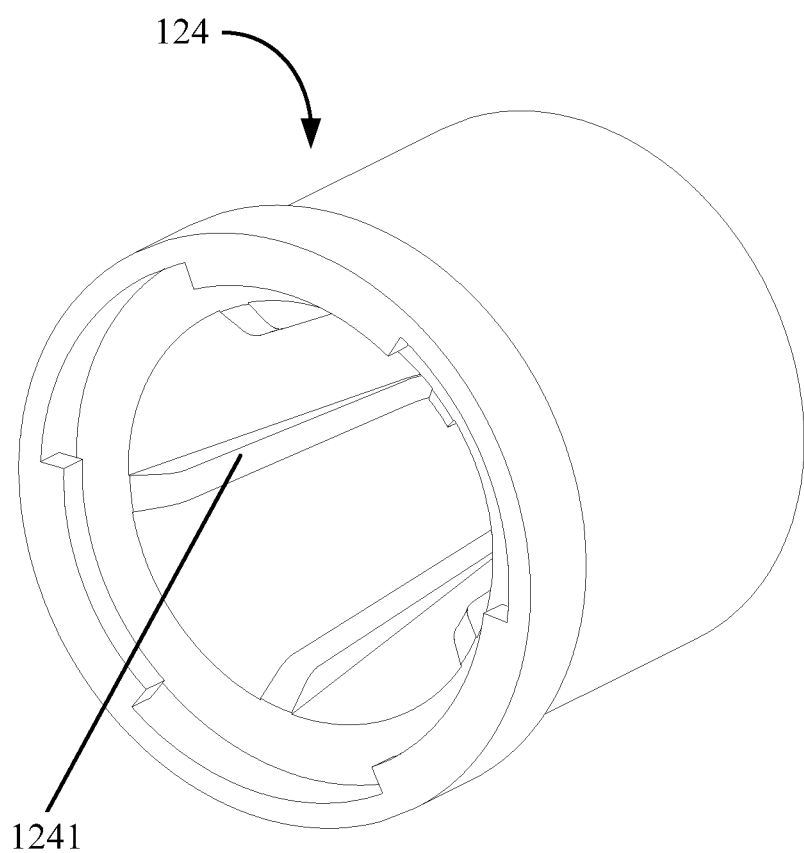
FIG. 4 is a structural schematic diagram of a barrel lid of the food processor in one embodiment of the present disclosure.
Figure 5:
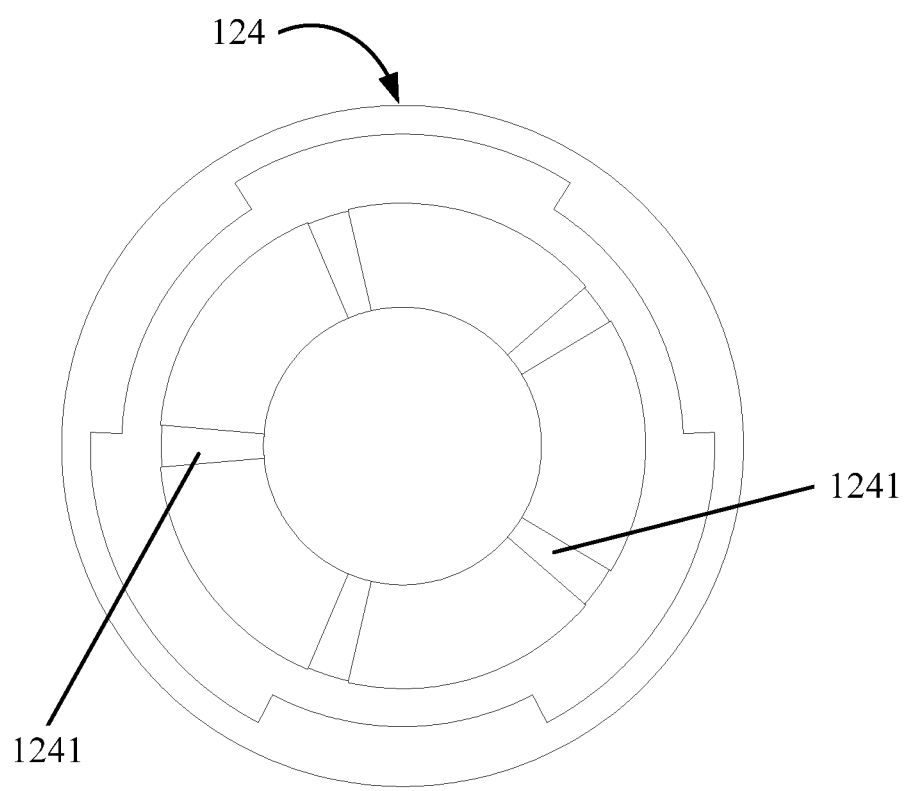
FIG. 5 is another structural schematic diagram of the barrel lid of the food processor in one embodiment of the present disclosure.

In the above-mentioned technical solution, preferably, as shown in FIG. 4 and FIG. 5, a plurality of guide and residue discharge ribs 1241 distributed at intervals are arranged on the inner side wall of the barrel lid 124, and the plurality of guide and residue discharge ribs 1241 are distributed along the axial direction of the barrel lid 124.

In the technical solution, as the guide and residue discharge ribs 1241 are arranged on the inner side wall of the barrel lid 124, the food residues can be pushed to the residue outlet 122 more quickly by the threaded fit of the guide and residue discharge ribs 1241 and the extrusion screw, therefore the rotation of the food residues along the extrusion screw can be prevented, and thus the discharge speed of the food residues can be improved to improve the discharge efficiency of the food residues.

In the above-mentioned technical solution, preferably, as shown in FIG. 4 and FIG. 5, the size of the guide and residue discharge rib 1241 in the radial direction of the barrel lid 124 gradually decreases from one end close to the barrel seat 123 to one end of the residue outlet 122.

In the technical solution, the height of the guide and residue discharge rib 1241, that is, the size of the guide and residue discharge rib 1241 in the radial direction of the barrel lid 124 gradually decreases from one end close to the barrel seat 123 to one end of the residue outlet 122, therefore the structure of the guide and residue discharge rib 1241 adapts to that of the inner cavity of the barrel lid 124, thereby being more beneficial for the barrel lid 124 to discharge the residues.

In the above-mentioned technical solution, preferably, as shown in FIG. 4 and FIG. 5, the plurality of guide and residue discharge ribs 1241 are uniformly and symmetrically distributed in the barrel lid 124.

In the technical solution, as the plurality of guide and residue discharge ribs 1241 are uniformly and symmetrically distributed in the barrel lid 124, the residue discharge effects on the same circumferential direction of the barrel lid 124 are the same, therefore due to the arrangement of the guide and residue discharge ribs 1241, the situation of residue blockage caused by pressure difference on the circumferential direction in the barrel lid 124 can be prevented, which is very beneficial for the barrel lid 124 to discharge the residues.

In the above-mentioned technical solution, preferably, at least one groove 11b is arranged on the inner side wall of the first barrel body 11, and the groove 11b is arranged along the axial direction of the first barrel body 11; and/or, at least one convex rib is arranged on the inner side wall of the first barrel body 11, and the convex rib is arranged along the axial direction of the first barrel body 11.

In the technical solution, the groove or the convex rib is arranged on the inner side wall of the first barrel body 11 to increase the friction between the food and the side wall of the first barrel body 11, therefore the food can generate greater friction with the side wall of the first barrel body 11 under the action of the crushing device 13, then the food can be better crushed in the first barrel body 11, after the food enters the second barrel body 12, the juice-residue separation of the food is more thorough, accordingly the juice yield can be improved, wherein the form of expression of the groove can be a concave point, at this time, it is equivalent that the groove is small enough, similarly, the form of expression of the convex rib can also be a convex point, and at this time, it is equivalent that the convex rib is small enough.

In the above-mentioned technical solution, preferably, as shown in FIG. 6, a preset gap b is arranged between the inner side wall of the first barrel body 11 and the crushing device 13, and the value of the preset gap b is: 0.2 mm≤b≤5 mm.

In the technical solution, as the preset gap b is arranged between the inner side wall of the first barrel body 11 and the crushing device 13, the food entering the first barrel body 11 is located in the preset gap b and is crushed under the coaction of the first barrel body 11 and the crushing device 13, and the crushed food is pushed to the communication opening 18 along the crushing device 13 under the guidance of the crushing device 13 and enters the second barrel body 12 through the communication opening 18.

In the above-mentioned technical solution, preferably, the preset gap b on one end close to the feed inlet is greater than the preset gap b on one end close to the communication opening 18.

In the technical solution, the first barrel body 11 is set into a shape that is large at the upper part and small at the lower part, that is, the preset gap b gradually decreases from the end close to the feed inlet to the end close to the communication opening 18, this setting can better crush the food, specifically, for example, when the food just enters the first barrel body 11, the granules of the food are greater, the distance between the inner side wall of the first barrel body 11 and the crushing device 13 adapts to the granules of the food, under the action of the crushing device 13 and the first barrel body 11, the food is gradually crushed to smaller granules and gradually moves toward the communication opening 18, therefore the preset gap b close to the communication opening 18 is set to be smaller, thereby adapting to the sizes of the granules of the food herein on the one hand, and further crushing the food herein to smaller granules under the coaction of the crushing device 13 and the first barrel body 11 on the other hand, accordingly gradual and sufficient crushing of the food can be realized, and then the juice yield of the food can be improved.

In the above-mentioned technical solution, preferably, the first barrel body 11 and/or the second barrel body 12 are/is made of a transparent material or a stainless steel material.

In the technical solution, since the first barrel body 11 and the second barrel body 12 are made of the transparent material, the user can clearly see the food in the first barrel body 11 and the second barrel body 12, as a result, the user can master the condition of the food in the first barrel body 11 and the second barrel body 12, and thus the user experience can be improved. If the first barrel body 11 and the second barrel body 12 are made of the stainless steel material, the strength of the first barrel body 11 and the second barrel body 12 can be ensured on the one hand, and the rusting and other conditions of the first barrel body 11 and the second barrel body 12 can be prevented on the other hand, therefore the durability of the first barrel body 11 and the second barrel body 12 can be improved.

Figure 7:
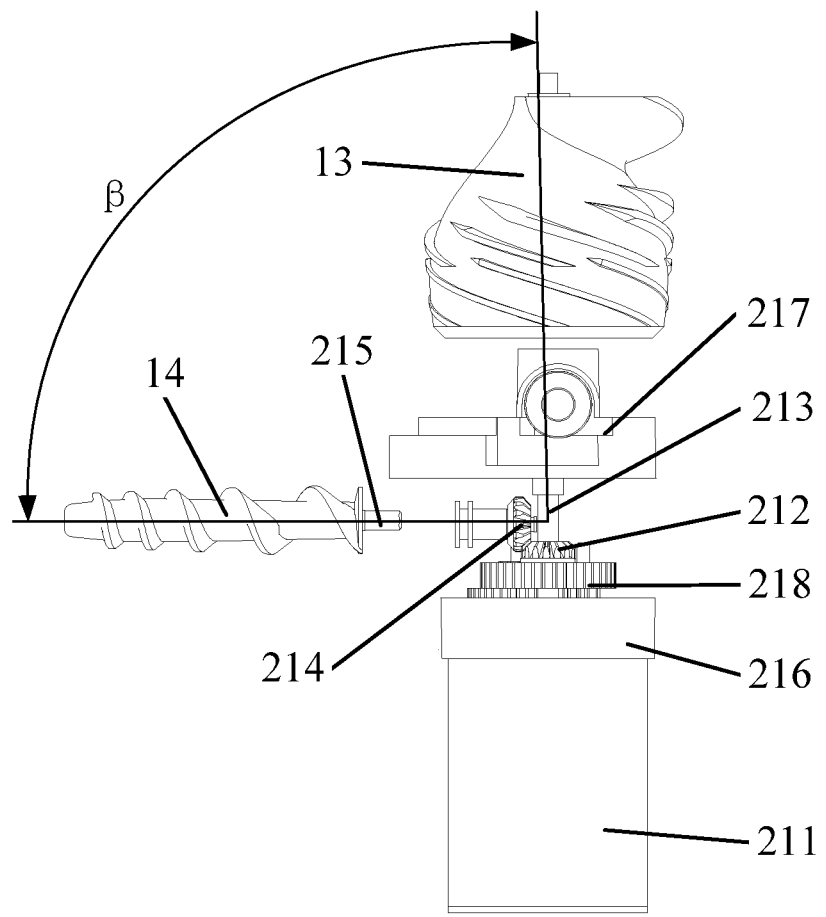
FIG. 7 is a schematic diagram of a decomposed structure of an inner structure of the food processor in one embodiment of the present disclosure.
Figure 8:
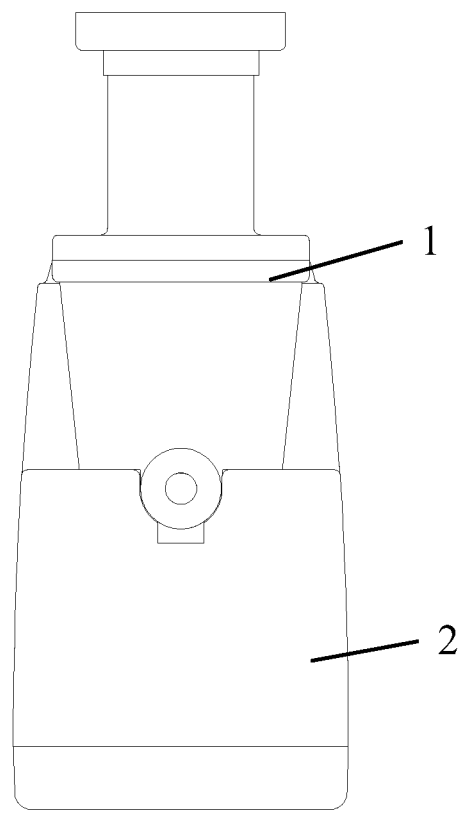
FIG. 8 is another structural schematic diagram of the food processor in one embodiment of the present disclosure.
Figure 9:
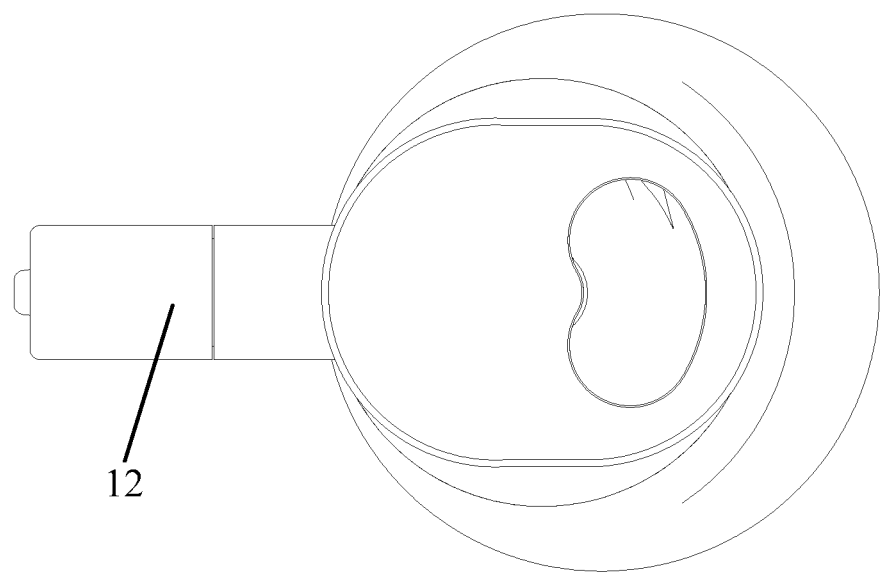
FIG. 9 is yet another structural schematic diagram of the food processor in one embodiment of the present disclosure.

In the above-mentioned technical solution, preferably, as shown in FIG. 7, the driving component 21 includes a motor 211 on which a motor shaft is arranged; a transmission component which at least includes: a first transmission part 212 which is in driving connection with the motor shaft, wherein a first driving shaft 213 is arranged on the first transmission part 212, and the first driving shaft 213 is connected to the crushing device 13 and is used for driving the crushing device 13 to rotate; and a second transmission part 214 which is in driving connection with the motor shaft, wherein a second driving shaft 215 is arranged on the second transmission part 214, and the second driving shaft 215 is connected to the extrusion device 14 and is used for driving the extrusion device 14 to rotate.

In the technical solution, two or more driving shafts can simultaneously drive the crushing device 13 and the extrusion device 14 by means of the transmission of the same motor 211 and the transmission component, that is, the driving component 21 drives a plurality of shafts, including two or more shafts, by the same motor 211, the driving shafts can be realized by the same reduction gearbox or different reduction gearboxes, and specifically, the direction can be changed by different gear transmission or other transmission manners, such as a helical gear, a bevel gear, a turbine, a worm, a staggered shaft helical gear and the like, in order to realize preset angle output among the plurality of driving shafts.

Preferably, as shown in FIG. 7, the first driving shaft 213 is vertically arranged, the second driving shaft 215 forms a preset angle β with the first driving shaft 213, wherein preferably the value of the preset angle β is: 60°≤β≤135°, further preferably, the value of the preset angle β is greater than or equal to 70° and smaller than or equal to 120°, and specifically, as shown in FIG. 7, for example, the value of the preset angle β is 90°, that is, the first driving shaft 213 and the second driving shaft 215 are arranged to be vertical to each other.

In the technical solution, the first barrel body 11 can be vertically arranged, the first driving shaft can be vertically arranged in the first barrel body 11, meanwhile, the feed inlet is formed in the upper end of the first barrel body 11, and the communication opening 18 is formed in the bottom of the first barrel body 11, by means of this setting, the food in the first barrel body 11 can enter the second barrel body 12 more quickly and more smoothly under the dual function of the gravity of the food and the crushing device, and thus the crushing efficiency of the food in the crushing phase can be improved. Meanwhile, preferably, the second barrel body 12 can be arranged on one side below the first barrel body 11 and communicate with the first barrel body through the communication opening, by means of this setting, the crushed food in the first barrel body 11 can enter the second barrel body 12 easily, but the included angle between the first barrel body 11 and the second barrel body 12 cannot be too small or too large, otherwise the smoothness of the second barrel body 12 is insufficient, thus cannot extrude the juice and discharge the residues just like the horizontal juicer, therefore the included angle between the first barrel body 11 and the second barrel body 12 is preferably within the range of being greater than or equal to 70° and smaller than or equal to 120°, at this time, the preset angles of the first driving shaft and the second driving shaft are within the range of being greater than or equal to 70° and smaller than or equal to 120°, this setting is very beneficial for the second barrel body 12 to extrude juice and discharge residues, and thus the juice yield can be improved.

In the above-mentioned technical solution, preferably, a rotating speed ratio of the first driving shaft 213 to the second driving shaft 215 is A, and the value of the rotating speed ratio A is: 0.8≤A≤1.5, specifically, for example, the rotating speed of the crushing device 13 is 60 RPM, and the rotating speed of the extrusion device 14 is set to 48-90 RPM.

In the technical solution, the rotating speed ratio A of the first driving shaft 213 to the second driving shaft 215 is reasonably set to make the food crushing degree adapt to the juice extrusion and residue discharge degree, thereby preventing the situation of insufficient food crushing or insufficient juice extrusion and the like, and accordingly the food can be sufficiently crushed and can also be sufficiently extruded to improve the juice yield of the food.

In the above-mentioned technical solution, preferably, rotating directions of the first driving shaft 213 and the second driving shaft 215 are the same or opposite.

In the technical solution, the first driving shaft 213 and the second driving shaft 215 can rotate on the same direction, for example, rotating clockwise or rotating counterclockwise, of course, the first driving shaft 213 and the second driving shaft 215 can also rotate oppositely, and specifically, for example, one rotates clockwise while the other rotates counterclockwise.

In the above-mentioned technical solution, preferably, as shown in FIG. 7, the transmission component further includes: a shell, wherein the shell includes an upper shell 217 and a lower shell 216, which are assembled together, the upper shell 217 and the lower shell 216 are enclosed to form a mounting cavity, the first transmission part 212 and the second transmission part 214 are located in the mounting cavity, and the first driving shaft 213 and the second driving shaft 215 extend out from the shell.

In the technical solution, the first transmission part 212, the second transmission part 214, the first driving shaft 213 and the second driving shaft 215 can be mounted in the shell, therefore during specific use, the transmission component can be moved and replaced as an entirety.

In the above-mentioned technical solution, preferably, as shown in FIG. 7, the transmission component further includes a deceleration component 218 arranged between the first transmission part 212 and the motor shaft and/or between the second transmission part 214 and the motor shaft and used for reducing the rotating speed of the motor shaft to a rotating speed necessary for the first driving shaft 213 and/or the second driving shaft 215.

In another technical solution, of course, the rotation of the crushing device 13 and the extrusion device 14 can also be driven by two motors 211 respectively, or the rotation of the crushing device 13 and the extrusion device 14 is driven without using the motor 211 or in other driving manners, and specifically, for example, the crushing device 13 and the extrusion device 14 can be driven by an electromagnetic driving structure formed by combining an energized coil with a magnet.

In the above-mentioned technical solution, preferably, as shown in FIG. 1, the food processor further includes: a feeding barrel 17 arranged within the first barrel body 11, wherein the feed inlet is formed in the feeding barrel.

In the technical solution, a feeding barrel 17 can be specially arranged for controlling the feeding of the food, and at this time, the feed inlet is formed in the feeding barrel 17.

In another technical solution, of course, no feeding barrel 17 is specially arranged, and the food is directly placed in the first barrel body 11 at one time, at this time, a lid capable of being opened or closed is arranged within the first barrel body 11, and the feed inlet is the opening of the first barrel body 11.

In the above-mentioned technical solution, preferably, as shown in FIG. 1, the host component 2 further includes a base 22 and an enclosure 23, wherein the enclosure 23 and the base 22 are enclosed to form an accommodation cavity, and the driving component 21 is mounted on the base 22 and is located in the accommodation cavity.

In the above-mentioned technical solution, preferably, the host component further includes a control module used for controlling working parameters of the food processor, specifically, for example, the rotating speeds of the crushing device 13 and the extrusion device 14, etc.

In the above-mentioned technical solution, preferably, the host component further includes a power supply module, wherein the power supply module is used for supplying power for the parts and components of the food processor, for example, the driving component, and the power supply module at least includes a power plug that can be inserted into the electric supply, and thus, during specific use, the power plug can be directly connected to the electric supply so as to supply power for the food processor. In the above-mentioned technical solution, preferably, the food processor includes a juice machine and a juicer.

In the description of the present specification, the terms "first" and "second" are used for descriptive purposes only and cannot be construed as indicating or implying relative importance, unless expressly stated and limited otherwise; the terms "connection", "mounting", "fixation" and the like should be broadly defined unless otherwise specified or indicated, for example, the "connection" may be a fixed connection, may also be a detachable connection, or an integral connection; and it may be directly connected and may also be indirectly connected through an intermediate medium. Those of ordinary skill in the art can understand the specific meanings of the above terms in the present disclosure based on specific situations.

In the description of the present specification, the description of the terms "one embodiment," "some embodiments," "specific embodiments" and the like means that a particular feature, structure, material or characteristic described in combination with the embodiment or example is included in at least one embodiment or example of the present disclosure. In the present specification, the schematic representation of the above terms does not necessarily refer to the same embodiment or example. Furthermore, the particular features, structures, materials or characteristics described may be combined in any suitable manner in any one or more embodiments or examples.

The foregoing descriptions are merely preferred embodiments of the present disclosure and are not intended to limit the present disclosure. For those skilled in the art, the present disclosure may have various modifications and changes. Any modifications, equivalent substitutions, improvements and the like made within the spirit and principle of the present disclosure should be encompassed in the protection scope of the present disclosure.

What is claimed is:

1. A food processor, comprising:
a host component which comprises a driving component;
a barrel body component mounted on the host component, wherein the barrel body component further comprises:
 a feed inlet;
 a first barrel body communicated with the feed inlet;
 a second barrel body communicated with the first barrel body through a communication opening;
 a residue outlet arranged on the second barrel body;
a crushing device arranged within the first barrel body, connected to the driving component and rotating under the driving of the driving component; and
an extrusion device arranged within the second barrel body, connected to the driving component and rotating under the driving of the driving component;
wherein the crushing device, through rotation, crushes food entering the first barrel body from the feed inlet against an inner side wall of the first barrel body, and the crushed food enters the second barrel body through the communication opening under the action of the crushing device, whereby juice is separated from residues under the extrusion of the extrusion device in the second barrel body, the residues subjected to juice-residue separation is discharged through the residue outlet, and wherein the second barrel body comprises:
- a hollow barrel seat with one open end, wherein the other end of the barrel seat is communicated with the first barrel body through the communication opening; and
- a barrel lid covering the open end of the barrel seat, wherein the residue outlet is arranged on the barrel lid.

2. The food processor of claim 1, further comprising:
a juice outlet arranged on the second barrel body, wherein food juice subjected to juice-residue separation is discharged through the juice outlet.

3. The food processor of claim 2, wherein,
a filter sheet is arranged at the juice outlet; and/or
an extrusion sheet is arranged at the residue outlet.

4. The food processor of claim 1, wherein a projection width of the communication opening in a radial direction of the extrusion device is greater than a diameter of a location corresponding to the communication opening on the extrusion device, the projection length of the communication opening in an axial direction of the extrusion screw is (L), and the projection length (L) is more than or equal to 3.8 mm and less than or equal to 19.9 mm.

5. The food processor of claim 2, wherein,
the extrusion device is an extrusion screw, one end of the extrusion screw cooperating with the communication opening is a feed end, and the other end of the extrusion screw cooperating with the residue outlet is a discharge end; and
the extrusion screw comprises a rod body and threads arranged on the rod body, and an area of the cross section of the rod body firstly gradually increases and then gradually decreases from the feed end to the discharge end.

6. The food processor of claim 1, wherein the first barrel body and the barrel seat are of an integral structure.

7. The food processor of claim 1, wherein the barrel lid is a hollow column body with one open end, the open end of the barrel lid is covering the open end of the barrel seat, an inner cavity of the barrel lid gradually decreases from the open end of the barrel lid to the other end of the barrel lid, and the residue outlet is formed on the end face of the other end of the barrel lid.

8. The food processor of claim 1, wherein a mounting gap (a) is arranged between the extrusion screw and the inner side wall of the barrel lid, and the value of the mounting gap (a) is more than or equal to 0.3 mm and less than or equal to 3.99 mm.

9. The food processor of claim 8, wherein the inner side wall of the barrel lid has a preset inclination angle γ, and the value of the preset inclination angle γ is more than or equal to 4° and less than or equal to 30°.

10. The food processor of claim 1, wherein a plurality of guide and residue discharge ribs distributed at intervals are arranged on the inner side wall of the barrel lid, and the plurality of guide and residue discharge ribs are distributed along the axial direction of the barrel lid.

11. The food processor of claim 10, wherein a size of the guide and residue discharge rib in the radial direction of the barrel lid gradually decreases from one end close to the barrel seat to one end of the residue outlet.

12. The food processor of claim 10, wherein the plurality of guide and residue discharge ribs are uniformly and symmetrically distributed in the barrel lid.

13. The food processor of claim 1, wherein,
at least one groove is arranged on the inner side wall of the first barrel body, and the groove is arranged along an axial direction of the first barrel body; and/or
at least one convex rib is arranged on the inner side wall of the first barrel body, and the convex rib is arranged along the axial direction of the first barrel body.

14. The food processor of claim 1, wherein a preset gap (b) is arranged between the inner side wall of the first barrel body and the crushing device, and a value of the preset gap (b) is more than or equal to 0.2 mm and less than or equal to 5 mm.

15. The food processor of claim 14, wherein the preset gap (b) on one end close to the feed inlet is greater than the preset gap (b) on one end close to the communication opening.

16. The food processor of claim 1, wherein the driving component further comprises:
a motor on which a motor shaft is arranged; and
a transmission component that further comprises:
a first transmission part which is in driving connection with the motor shaft, wherein a first driving shaft is arranged on the first transmission part, and the first driving shaft is connected to the crushing device and is used for driving the crushing device to rotate; and
a second transmission part which is in driving connection with the motor shaft, wherein a second driving shaft is arranged on the second transmission part, and the second driving shaft is connected to the extrusion device and is used for driving the extrusion device to rotate.

17. The food processor of claim 16, wherein the first driving shaft is vertically arranged, and the first driving shaft forms a preset angle β with the second driving shaft.

18. The food processor of claim 16, wherein,
the value of a preset angle β is more than or equal to 60° and less than or equal to 135°; and/or
a rotating speed ratio of the first driving shaft to the second driving shaft is (A), and the value of the rotating speed ratio (A) is more than or equal to 0.8 and less than or equal to 1.5; and/or
the rotating directions of the first driving shaft and the second driving shaft are the same or opposite.

19. The food processor of claim 1, further comprising:
a feeding barrel arranged within the first barrel body, wherein the feed inlet is formed in the feeding barrel.

* * * * *